Figure 1:
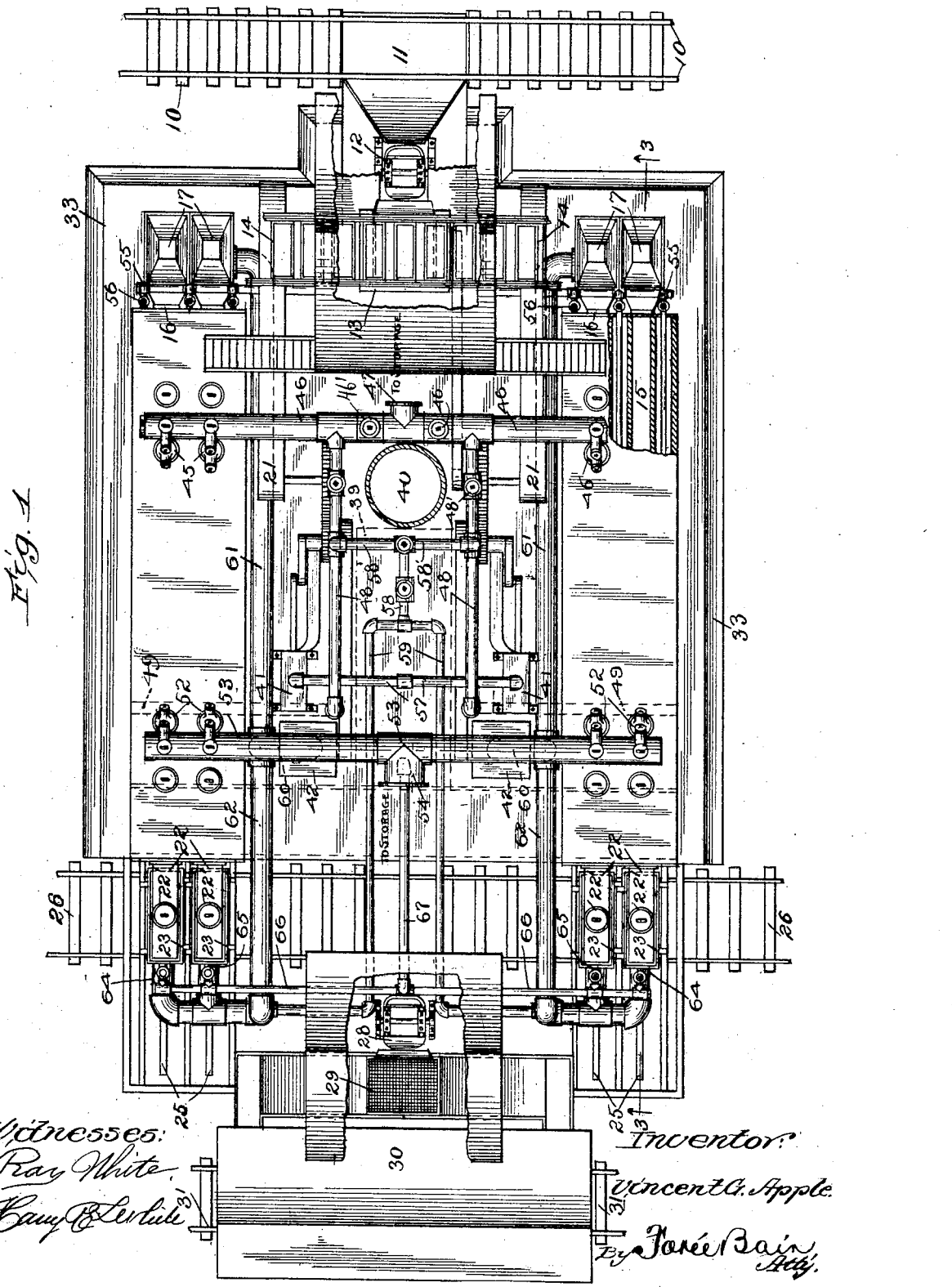

No. 777,829. PATENTED DEC. 20, 1904.
V. G. APPLE.
PROCESS OF MAKING GAS.
APPLICATION FILED AUG. 21, 1903.
NO MODEL. 5 SHEETS—SHEET 2.

Witnesses:
Ray White
Harry Rochelule

Inventor:
Vincent G. Apple
By Foree Bain Atty.

No. 777,829. PATENTED DEC. 20, 1904.
V. G. APPLE.
PROCESS OF MAKING GAS.
APPLICATION FILED AUG. 21, 1903.
NO MODEL. 5 SHEETS—SHEET 3.
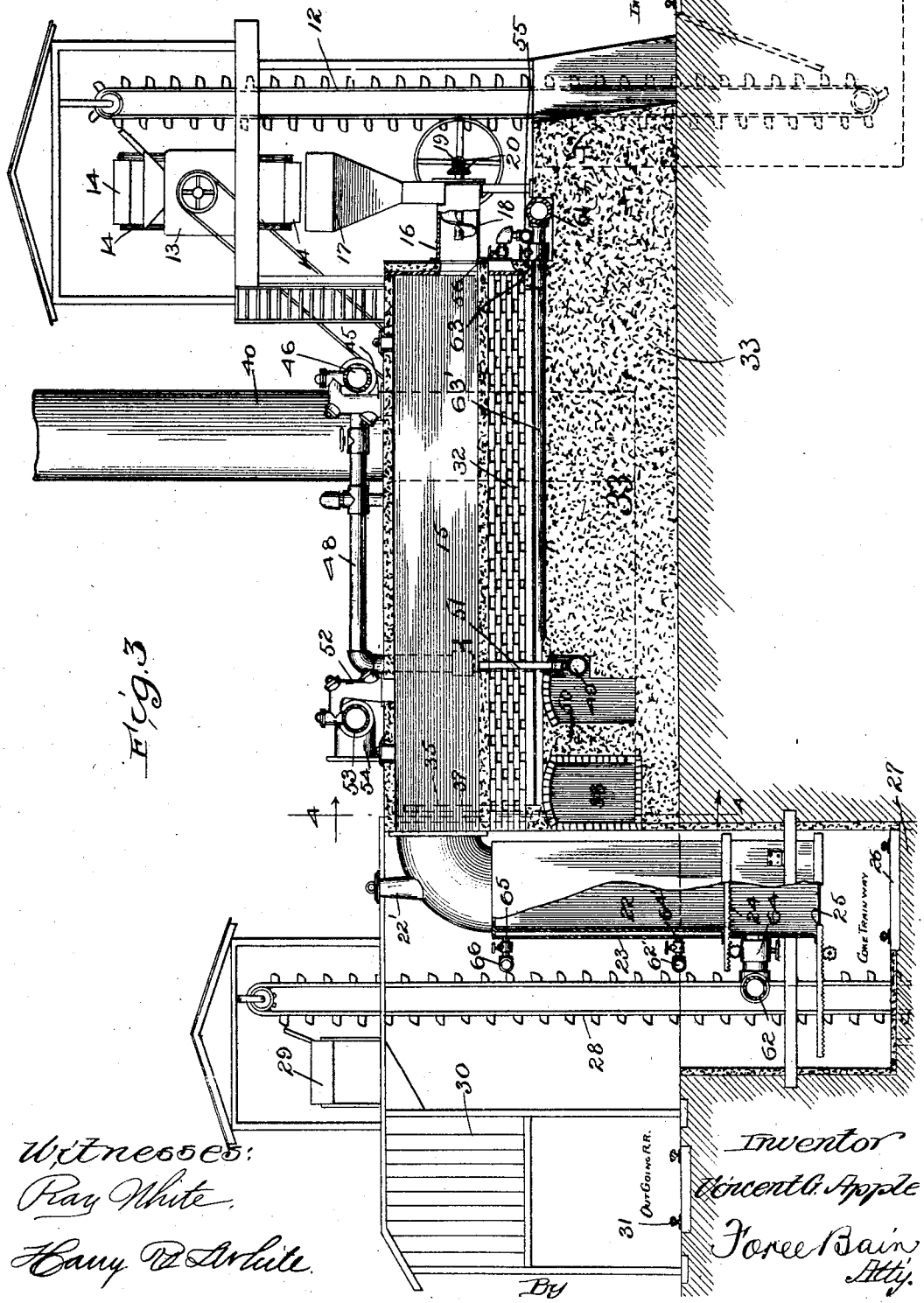

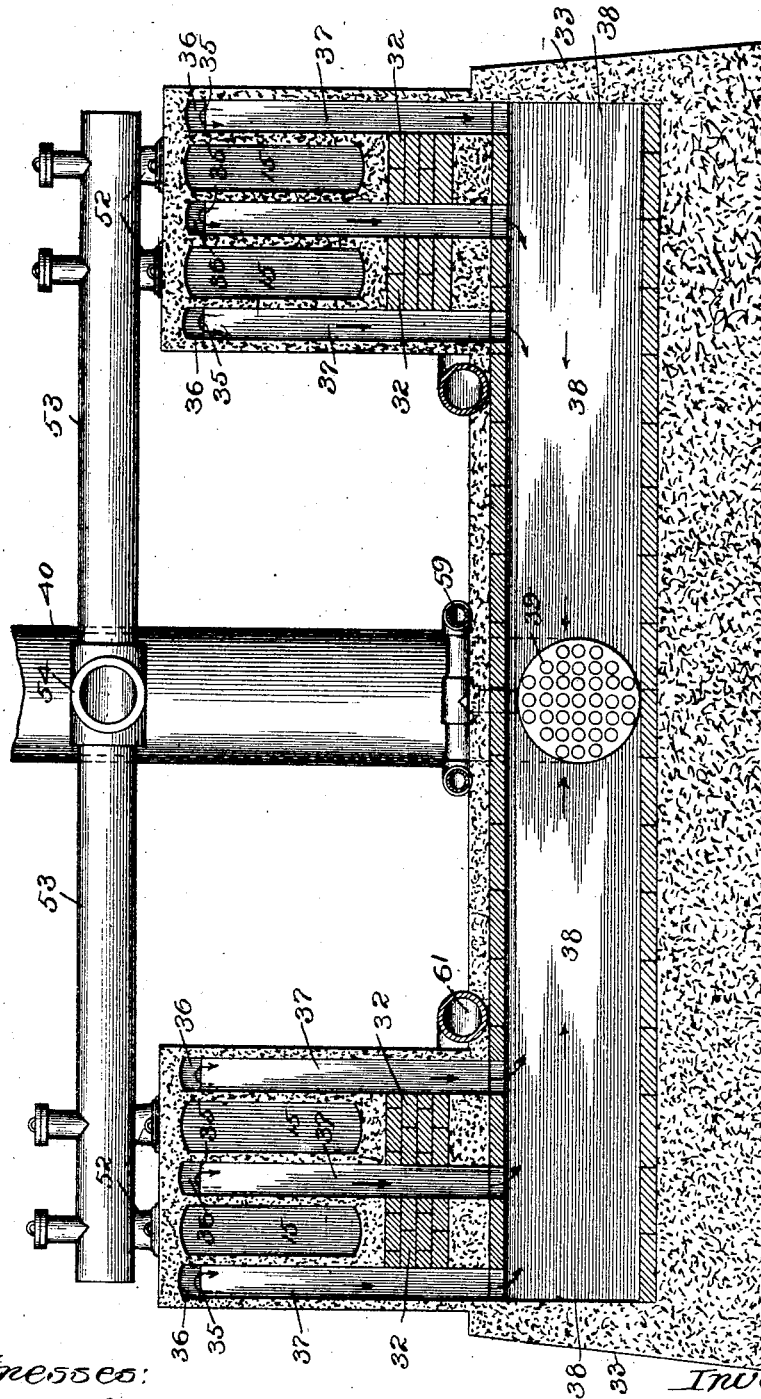

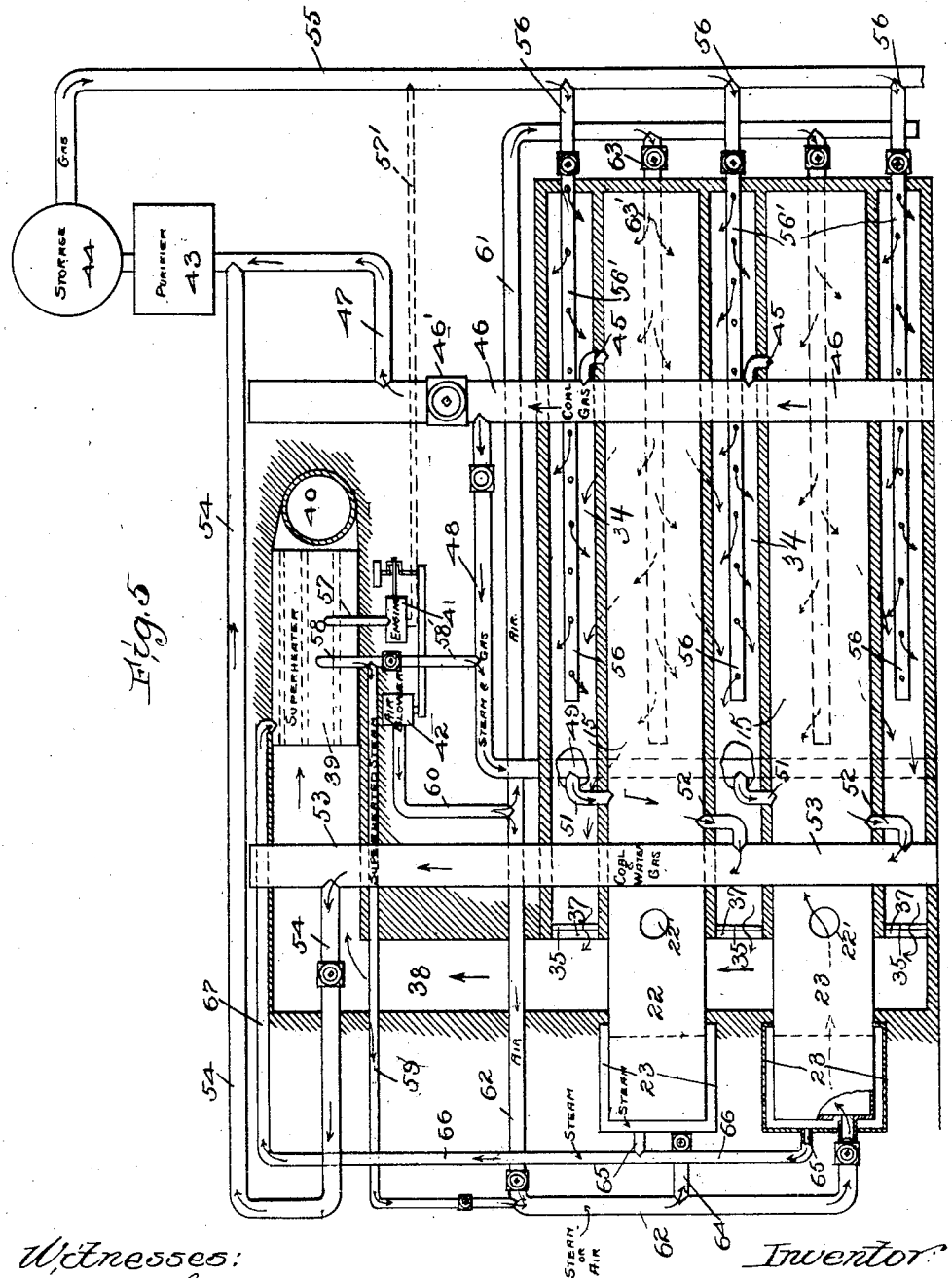

No. 777,829. Patented December 20, 1904.

UNITED STATES PATENT OFFICE.

VINCENT G. APPLE, OF DAYTON, OHIO.

PROCESS OF MAKING GAS.

SPECIFICATION forming part of Letters Patent No. 777,829, dated December 20, 1904.

Application filed August 21, 1903. Serial No. 170,284.

*To all whom it may concern:*

Be it known that I, VINCENT G. APPLE, of Dayton, in the county of Montgomery and State of Ohio, have invented certain new and useful Improvements in Processes and Methods of Fuel Transformation; and I hereby declare that the following is a full, clear, and exact description thereof, reference being had to the accompanying drawings, which form part of this specification.

My invention relates to an improved process and method of fuel transformation whereby carbonaceous material is treated to extract therefrom gases adapted for fuel or illuminating purposes and to leave the residual material in the form of coke.

In the usual practice of fuel transformation many losses are suffered, which result in inefficiency of production and consequent increase in the expense of operation. For example, the charging and discharging of the retorts takes time and cuts down the possible period of productive operation of the plant to a considerable extent. Again, when the green coal is charged into the hot retort considerable loss of gas results before the retort can be sealed. Furthermore, an immense amount of heat is wasted in the usual practice, both in the furnace or generator and during the treatment of the coke. In the treatment of the coke produced it is customary to remove the incandescent mass from the retort and to cool it either by exposure to the air or by drenching it with water. The former method is slow and necessarily requires considerable space for its completion; but the coke produced is of high quality and of lustrous silver-gray color. The water-drenched coke is of course more quickly cooled than that exposed to air, but the product is an inferior grade of coke of a dead-black color. In either of these methods of treatment, however, the heat emanating from the incandescent coke is entirely lost.

It is generally with a view to overcoming these disadvantages of manufacture and providing a new and improved process and method of coke and gas production that my invention is primarily designed.

One of the objects of my invention is to provide a continuous process and method of transforming fuel—that is to say, a process and method which permits of the treatment of constantly-renewed bodies of carbonaceous material in such a manner as to result in the continuous production of gas and coke from every retort.

A further object of my invention is to provide a method of operation in the practice whereof the heat generated is to a maximum degree utilized in the furtherance of the process to secure great efficiency and economy in the gas-production.

A yet further object of my invention is to provide a method of fuel treatment which will result in the production of a superior grade of coke in an economical and efficient manner.

A still further object of my invention is to provide a process of producing a high grade of gas.

One of the most useful applications of my invention is in the operation of fuel-gas plants designed to supply fuel and coke for manufacturing purposes, and I have therefore chosen to illustrate as an apparatus suitable to the practice of my invention a plant designed for the purpose described.

Figure 2:
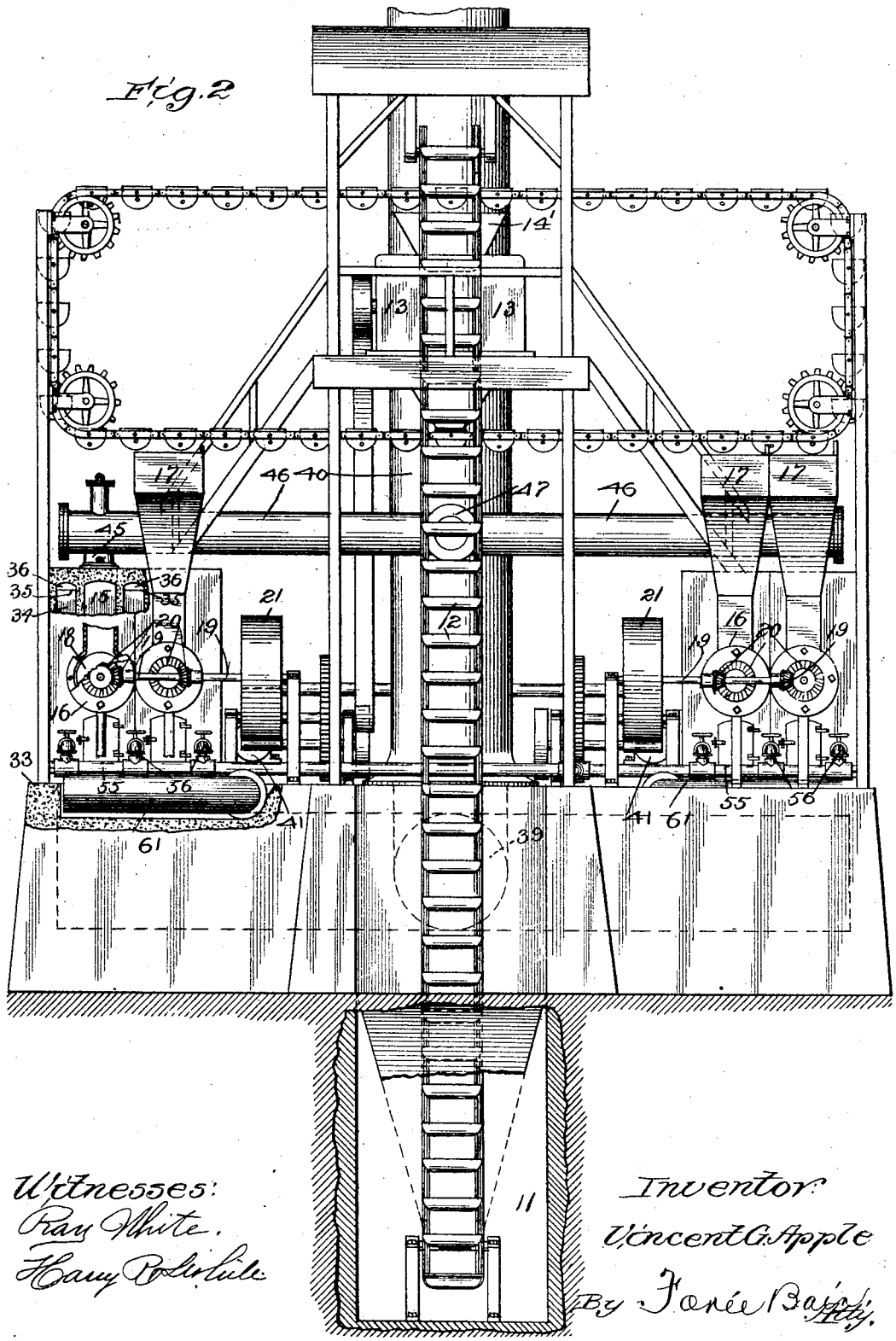

In the drawings, Figure 1 is a plan view, with parts broken away, of a gas and coke plant. Fig. 2 is a front elevation thereof. Fig. 3 is a sectional elevation taken on line 3 3 of Fig. 1. Fig. 4 is a transverse vertical section taken on line 4 4 of Fig. 3. Fig. 5 is a distorted diagrammatic plan of the plant.

From an inspection of the drawings it will be seen that the plant comprises generally a double battery of retorts and furnaces and a suitable equipment of power devices, crushing-machines, conveyers, and the like, the latter being preferably centrally arranged with reference to the two batteries of retorts and furnaces.

Specifically, 10 indicates the track for an incoming railroad whereby coal is conveyed to the plant.

11 indicates a dumping-bin in which the coal is deposited by the incoming car.

12 indicates a conveyer-flight designed to elevate the coal from said bin to a crusher 13, comprising part of the central equipment.

14 indicates a horizontal conveyer system whereby coal is distributed to the retort-feeders.

15 15 indicate generally the coke-retorts, of which there may be any suitable number, each of said retorts at its forward end being provided with a feed-spout 16, communicating with a hopper 17, arranged to receive coal from the conveyer system 14.

Within each feed-spout 16 is arranged a device for propelling coal therethrough to cause a positive feed from the hopper to the retort, in the present instance such device being illustrated as spiral screw 18, the shaft whereof projects from the front of the spout and is arranged to be driven from a power-shaft 19 through the intermediary of suitable gearing 20. As herein illustrated, an independent shaft 19 is provided for each battery of retorts, and each shaft is provided with a driving-pulley 21, designed to be constantly rotated.

Each retort 15 is longitudinally extended and its rear end is arranged in open communication with the top of a vertically-disposed coke-receiver 22.

22' indicates an outlet-spout rising from the coke-receiver.

23 indicates a water-jacket chamber surrounding the coke-receiver 22.

24 and 25 indicate two sliding doors or valves arranged to inclose therebetween a space of equal capacity with a coke tram-car and provided with suitable mechanism for independently operating them.

26 indicates a tramway designed to accommodate a tram-car, leading directly beneath the door 25 of the coke-cooler and extending to a centrally-disposed coke-pit 27. 28 indicates a conveyer-flight communicating with said coke-pit.

29 indicates a coke-screen arranged to receive coke from the conveyer-flight 28.

30 indicates an elevated coke-storage shed arranged to receive coke from the screen, and 31 an outgoing railway system so located that its cars can pass beneath the storage-shed 30.

Referring again to the retorts 15, each retort is mounted upon a setting of checkered brickwork 32, built upon the concrete foundations 33, underlying the main portions of the plant. Laterally, separating adjacent retorts, are arranged passages longitudinally coextensive with the retorts and each at its end partially blocked by a wall 35, so disposed as to leave therein an aperture 36, communicating by a corresponding conduit 37 with a transverse flue 38, extending laterally of the plant from side to side thereof in the concrete foundation 33.

39 indicates a steam boiler or superheater, the air-tubes of which communicate at one end with the flue 38 and at the other end lead to the smoke-stack 40. These parts are, as illustrated, preferably centrally located relative to the batteries of retorts and their setting.

41 indicates an engine, of which two are preferably provided, one on each side of the superheater 39, and arranged to be connected by suitable belting to drive the moving parts of the plant, such as the conveyers and the like.

42 42 indicate air-blowers of any preferred construction, preferably driven by the engines 41 and designed to supply the air required in the practice of my invention.

43 and 44 (illustrated only in Fig. 5) indicate, respectively, a purifier-house and a storage-tank of any preferred form constituting part of the completed gas plant, but having no important part in the present invention. It will be understood that any suitable devices for washing and scrubbing or otherwise treating the gas to purify it may be installed in the purifier-house 43.

The piping connections of the plant are preferably arranged as follows: 45 45 indicate the ascension-pipes, of which there is one for each retort arranged a suitable distance from the front end thereof and communicating with the usual hydraulic main 46. The main may be suitably valved, as shown at 46', to permit or prevent communication between said main and the purifier-house through the main 47. (Best illustrated in Fig. 5.) 48 48 indicate gas-mains, at one end arranged for communication with the hydraulic main 46 and provided with valves 48' to control such communication. At their rear ends said pipes are led into communication with transverse pipes 49 49, each extending beneath one of the batteries of retorts through a corresponding pipe-tunnel 50 and each connected by valved branch pipes 51 with the bottom of each retort of its corresponding battery at a point intermediate the position of the ascension-pipe 45 and the rear of the retort, as best shown in Fig. 3. 52 52 indicate secondary ascension-pipes, one for each retort, arranged in communication with its retort at a point approximately above the inlet of the branch pipe 51 and all communicating with the common main 53, which has a valved piping connection 54 with the main 47 leading to the purifier and storage-tank. From said storage-tank 44 a furnace-supply main 55 is led into proximity to the retorts, and valved branch pipes 56 lead therefrom into the furnaces, preferably in the passages 34 intermediate the retort. These branch pipes within the furnaces are perforated to form gas-burners 56'. If the engine 41, heretofore mentioned, be a gas-engine a pipe 57' (indicated in dotted lines in Fig. 5) may be arranged to establish connection between the said engine and the gas-supply main 55; but if the engine 41 be a steam-engine a pipe 57

(shown in full lines) is led from the steam-dome of the superheater 39 to the cylinder thereof to supply the necessary steam to run it. 58 indicates a valved steam-pipe fitting opening into the superheater 39 and communicating by branches 58′ with the gas-mains 48. Other branches 59 lead from the steam-pipe 58 to air-pipe, to be described. From each air-blower 42 an air-pipe 60 extends into communication with two pipes 61 and 62, which constitute the source of air-supply for the furnaces or generators and for the coke-receivers, respectively, of the corresponding retort-battery. The pipe 61 of each battery extends along the front thereof and is provided with a series of valved branches 63, each of which communicates with a perforated conduit 63′, arranged beneath a checker-work of a retort to supply air thereto. The other air-pipe 62 extends into proximity to the coke-receiver 22 and has a valved branch pipe 64 passing therefrom into the interior of each receiver near the base thereof. It is with this pipe 62 that the steam-pipe 59, heretofore described, communicates, each of said steam and air pipes 59 and 62 being provided with a valve mechanism, so that communication with the branch pipe 64 may be independently established or cut off. From a point near the top of each coke-receiver a branch pipe 65 leads from the water-jacket of said receiver into communication with a common steam-pipe 66, connected, as by a pipe 67, with the superheating-boiler 39.

It will be clearly understood that the specific arrangement of the plant heretofore described is simply suggestive of an arrangement of devices suitable for carrying my process into effect; but I do not desire as being understood as limiting myself to the use of any particular apparatus in the performance thereof.

The operation of the plant described in the performance of my process will be as follows: Gas and air to support combustion are supplied to the generators or furnaces by the pipes 56 and conduits 63′, respectively, and the retorts are thereby heated to the proper degree. Coal transported to the plant by the incoming railway 10 is dropped into the pit 11, transferred by the conveyer-flight 12 to the crusher 13, thence deposited in the conveyer 14, and distributed to the hoppers 17, associated with the various retorts of the batteries. By the operation of the screws 18 constantly-renewed quantities of the carbonaceous material are fed forward into each retort, and when the retort is full the constant pressure thereon generated by the screw at the front end of the retort moves the mass through the heated area of the retort and forces the rearmost material constantly into the coke-receiver 22 to be cooled. Thence the coke may be removed in suitable quantities to compensate for the constant removal of the charge by the proper operation of the doors 24 and 25 and allowed to fall into tram-cars upon the track 26, whence it is conveyed to the flight-conveyer 28 to be elevated to the screen 29 and storage-shed 30. When the green coal is introduced into the front end of the intensely-heated retort, destructive distillation at once sets in and coal-gas is evolved, such evolution of gas continuing until the distillation is complete and only coke remains as a residuum of the original coal. It is my intention to so construct and operate the retort and feeding devices, respectively, that the coal is moved through the heated retort at such a rate relative to the length of the retort that the distillation is substantially complete by the time the carbonaceous material has reached the point of entrance of the pipe 51, so that the inlet of said pipe 51 will be beyond the area of active distillation and will be confronted by a mass of incandescent coke from which substantially all of the gas has been removed. The gas evolved during the passage of material through the front portion of the retort is carried off through the ascension-pipe 45 and into the hydraulic main 46 of the battery in the usual manner. Thence the coal-gas, freed from a portion of its impurities, passes into the gas-pipe 48, associated with the battery, and at a suitable point is mingled with live steam received from the superheater through the pipe 58. The combined steam and gas thence passes through the pipe 49 and the branch pipe 51 into the bottoms of the various retorts, being discharged upon a mass of incandescent coke therein intermediate the area of active distillation and the point of entrance of the coke into the water-cooled receiver. Through the incandescent mass the gas passes to the secondary ascension-pipe 52 in its passage through the coke, being transformed by the action of the heat into a fixed combined water and coal gas, especially adapted for fuel purposes. From the ascension-pipe the fixed gas is led by the mains 53 and 54 to the purifying-house and storage-tank for proper purification. After its passage beyond the gas and steam inlet 51 the incandescent coke is forced into the top of the coke-receiver 22, whence it falls into the portion thereof surrounded by the water-jacket 23. Here its heat is extracted by the cooling action of the water-jacket properly supplied with water from any suitable source, such as a water-main 62′ and branch pipes 64′. The cooling-water, however, is quickly heated by the coke and transformed into steam, which is led off through the pipes 65, 66, and 67 to the steam-superheater 39. The heat of the coke is thus employed to transform water into steam for use in the furtherance of the process of gas-making.

It will be noted that the superheater is arranged in the path of the products of combustion, which escape from the furnaces into the transverse flue 38 and thence pass through the tubes of the superheater 39 into the smoke-stack 40. The surplus heat from the furnaces or generators is thus employed to superheat the steam received from the water-jacket before its introduction into the coal-gas in the pipe 48 in a manner heretofore described. Thus all of the heat which under the present system is allowed to go to waste is utilized in the furtherance of the gas-making process in the conversion of water into steam for subsequent mixture with the coal-gas. It will be observed that this conversion might be effected in several ways or by various means without departing from the invention. Furthermore, it will be noted that the coke is cooled in the receiver 22 without the direct application thereto of water, so that it retains its bright luster and its active fuel qualities. It is also found that pressure upon the coal and coke developed by the screw 18 in advancing the mass through the retort tends to produce a coke of uniform density and greater solidity than that produced by the ordinary treatment.

To produce the form of coke best adapted for metallurgical uses, I find that it is advantageous to employ coal carrying ten per cent. or twelve per cent. of water, the coke product in such cases being of considerable solidity.

If the quantity of coke produced be greater than the demand or if the coke production be considered unimportant, the supply of gas generated may be increased by employing the coke-receiver 22 as the water-gas retort. To this end the incandescent coke therein is first blown into active incandescence by the introduction of air, which passes under pressure from the air-blower 42 through the pipes 60, 62, and 64 into the coke-receiver, passing out therefrom through the blow-spout 22' at the top thereof. Steam taken from the superheater by the pipe 59 is then blown in through the pipe 62 into the incandescent mass of coke, passing therethrough and through a portion of the coke within the retort to the ascension-pipe 52, mingling with the combined coal and water gas generated by the passage of the coal-gas and steam from the pipe 51.

While I have herein described an arrangement whereby the coal-gas is taken directly from the hydraulic main for a mixture with steam and conversion into the fuel-gas, it will be apparent that the arrangement of the plant might readily be so varied that the coal-gas from main 46 would first be purified for the removal of its tar and ammoniacal impurities by passing it through a suitable purifier before its introduction into the mains 48.

Having thus described my invention, what I claim, and desire to secure by Letters Patent of the United States, is—

1. A continuous process of fuel transformation which consists in subjecting a constantly-renewed body of carbonaceous material to destructive distillation while moving in a heated area, and thereby raising it to incandescence, extracting heat from said incandescent material when removed from said area by water, and thereby converting the water into steam, mixing the steam and the gas of distillation and passing the mixture through the incandescent carbonaceous material.

2. A continuous process of fuel transformation which consists in subjecting a constantly-renewed body of carbonaceous material to dry distillation while moving in a heated area, to resolve the said material into gas and incandescent coke, extracting heat from the incandescent coke by water, thereby converting the water into steam, mixing the steam and gas, and passing the mixture through the incandescent coke at a point intermediate the area of active distillation and the coke-cooling area.

3. A continuous process of fuel transformation which consists in passing a constantly-renewed body of carbonaceous material through an intensely-heated area and subsequently through a cooled area, drawing off the coal-gas while the material is in movement through the first portion of the heated area, mixing said gas with steam, and passing the mixture through the carbonaceous material after it leaves the first portion of the heated area and before it reaches the cooled area.

In testimony that I claim the foregoing as my own I affix my signature in presence of two witnesses.

VINCENT G. APPLE.

Witnesses:
   JOHN L. SCANLON,
   H. H. FISH.